(12) United States Patent
Featherstone

(10) Patent No.: US 6,458,184 B2
(45) Date of Patent: Oct. 1, 2002

(54) RECOVERY OF ZINC FROM GEOTHERMAL BRINES

(75) Inventor: John L. Featherstone, El Centro, CA (US)

(73) Assignee: MidAmerican Energy Holdings Company, Omaha, NE (US)

( * ) Notice: Subject to any disclaimer, the term of this patent is extended or adjusted under 35 U.S.C. 154(b) by 76 days.

(21) Appl. No.: 09/746,312

(22) Filed: Dec. 20, 2000

Related U.S. Application Data

(63) Continuation of application No. 09/320,167, filed on May 26, 1999, now abandoned.

(51) Int. Cl.[7] .............................................. E21B 43/28
(52) U.S. Cl. ........................ 75/712; 75/725; 210/634; 210/638; 423/100
(58) Field of Search ................................ 205/602, 604, 205/605, 606; 210/634, 638, 767, 688; 423/100; 75/712, 725

(56) References Cited

U.S. PATENT DOCUMENTS

| | | |
|---|---|---|
| 4,537,684 A | 8/1985 | Gallup et al. |
| 4,624,704 A | 11/1986 | Byeseda |
| 4,756,888 A | 7/1988 | Gallup et al. |
| 5,078,842 A | 1/1992 | Wood et al. |
| 5,158,603 A * | 10/1992 | Stierman et al. ............... 423/22 |
| 5,229,003 A | 7/1993 | Duyvesteyn |
| 5,236,491 A * | 8/1993 | Duyvesteyn et al. ........ 423/276 |
| 5,268,108 A | 12/1993 | Gallup et al. |
| 5,288,411 A | 2/1994 | Gallup et al. |

OTHER PUBLICATIONS

Schultze, L.E. & Bauer, D.J. (Oct. 1982) "Comparison of Methods for Recovering Metal Values From Salton Sea KGRA Brines" Geothermal Resources Counsil, *Transactions* 6:111–113.

\* cited by examiner

*Primary Examiner*—Nam Nguyen
*Assistant Examiner*—Wesley A. Nicolas
(74) *Attorney, Agent, or Firm*—Morrison & Foerster LLP

(57) ABSTRACT

Improved methods are disclosed for the efficient and cost-effective recovery of zinc metal from zinc-containing brines. Zinc is first bound to an anionic ion exchange resin (IX) which has been equilibrated with a solution containing a reducing agent, washed, and eluted with an elution solution. A reducing agent can be added to the brine prior to loading on the IX and can optionally be added to the IX after the washing step. The eluted zinc is extracted with a water-immiscible cationic organic solvent (SX), which is scrubbed, then stripped with concentrated acid. Substantially pure zinc is recovered by electrowinning the zinc-loaded concentrated acid solution.

16 Claims, 13 Drawing Sheets

RECOVERY OF ZINC FROM GEOTHERMAL BRINES

CROSS REFERENCE TO RELATED APPLICATIONS

This application is a continuation of U.S. Ser. No. 09/320,167, which was filed on May 26, 1999, now abandoned.

TECHNICAL FIELD

The invention relates to the field of metal recovery from solutions, particularly the recovery of zinc metal from geothermal brines.

BACKGROUND ART

The term "brines," when used in its broad sense, includes brines from a variety of sources, such as geothermal vents, oil drilling, metal mining, and industrial waste and by-product streams. Such brines frequently contain high concentrations of commercially valuable metal ions.

Geothermal brines are of particular interest as they can be used as a source of power for electricity production. In areas such as California, subterranean pools of geothermal brines can be reached by drilling. When piped to the surface, the highly pressurized and heated brines "flash" to produce steam, which can be used to run steam turbines and produce electricity. The "flashed" brine that results from power production is frequently rich in commercially valuable metals such as zinc, silver, manganese, lithium and lead. Recovery of dissolved metals from flashed steam used for power generation is attractive as a sidestream or downstream process, and has the potential to increase the overall profitability of geothermal power operations.

Methods have been proposed for the recovery of metals from flashed geothermal brines, such as that disclosed in U.S. Pat. No. 4,624,704. This patent discloses the use of a quaternary amine (e.g., a methyl trialkyl ammonium chloride in which the alkyl group is 8 to 10 carbon atoms) dissolved in a water immiscible organic solvent for use in a single step liquid extraction. The loaded solvent extractant is stripped by contacting it with an aqueous sodium sulfate solution, resulting in an aqueous zinc chloride/sodium sulfate phase and an immiscible zinc depleted organic extractant phase.

Other methods rely on precipitation of metals from geothermal brines. For example, Schultze et al. (Geothermal Resources Council, *Transactions,* 6: 111–113, October, 1982) compare lime precipitation with sulfide precipitation of metals from geothermal brines. This disclosure teaches that precipitation methods can be quite efficient (up to 95% of iron, manganese, lead and zinc can be precipitate by the addition of lime). However, precipitation methods also require that each particular metal be separated from co-precipitated materials. Addition of lime also increases the pH of the brine to levels which make reinjection of the spent brine into the source geothermal formation difficult.

U.S. Pat. No. 5,229,003 discloses a method for zinc recovery from geothermal brines that is of particular relevance. This patent discloses the use of a two-step extract process which may utilize either ion exchange (IX) or solvent (SX) extraction steps. While the method disclosed in the '003 patent is minimally operable, it suffers from several deficiencies that severely reduce its industrial applicability. For example, this method is susceptible to iron and calcium fouling on and in the IX resin, which reduces the effectiveness and lifespan of the IX resin as well as the profitability of the metal recovery process. The lifespan and effectiveness of the IX resin are critical to the feasibility of a metal recovery operation because IX resins are costly when used in large amounts in metal recovery operations.

Accordingly, there is a need in the art for a method of recovering zinc from zinc-containing brines at high efficiency and low cost.

DISCLOSURE OF THE INVENTION

The invention is directed towards a process for the recovery of substantially pure zinc (Zn) from brines which contain recoverable amounts of Zn and other metals.

In one embodiment, brine is passed over an ion exchange (IX) resin which binds zinc, wherein the resin has been pre-equilibrated with a solution containing a reducing agent. The loaded resin is washed with a hot aqueous acidic 'salt wash', then eluted with an aqueous acidic solution containing a reducing agent. The metals deleterious to downstream processes (e.g., iron, arsenic and lead) are removed from the zinc-rich eluate by oxidation followed by solids removal. The zinc is extracted from the eluate in a solvent extraction (SX) process utilizing a water immiscible cationic extractant (SX extractant). After removal of the aqueous (Zn-depleted) phase, the Zn-loaded SX extractant is scrubbed with a dilute acid solution, washed with reverse osmosis (RO) water and then stripped with a sulfuric acid solution. The sulfuric acid/zinc solution is separated from the stripped SX extractant and is used for electrowinning of Zn.

In another embodiment, reducing agent is added to the brine prior to loading onto the IX resin.

In a further embodiment, the loaded IX resin is backwashed prior to elution.

In another embodiment, the SX organic phase is washed with 6 molar (M) HCl prior to remove accumulated iron from the organic. This iron, if uncontrolled, seriously affects the performance of the organic.

MODES FOR CARRYING OUT THE INVENTION

Figure 1:
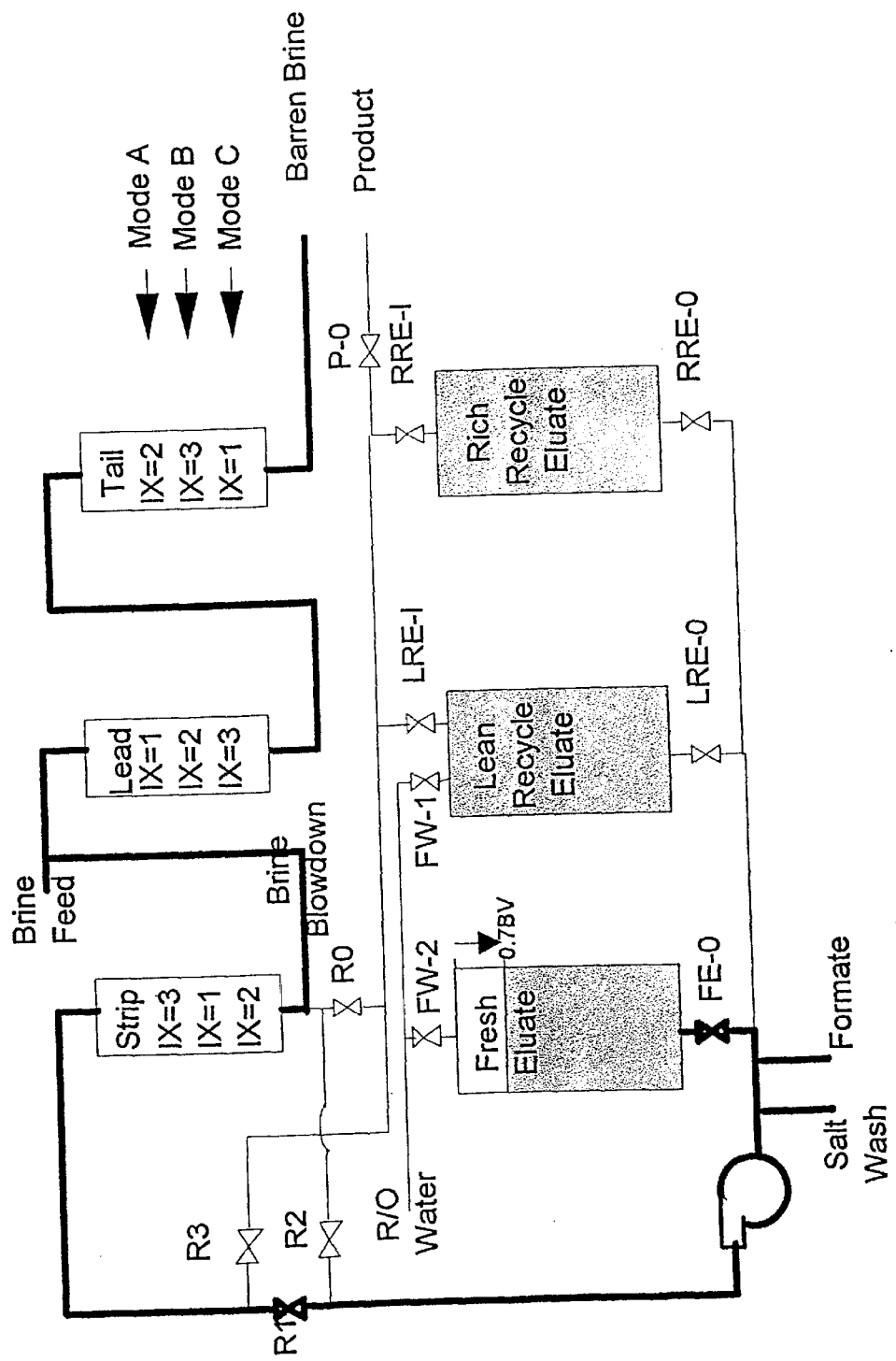
FIG. 1 illustrates Stage 1A1 of the inventive method.

Materials and equipment for use in the instant invention must be corrosion resistant, as Zn-containing brines can be highly corrosive. Non-ferrous materials should be used for all wetted surfaces. Materials and equipment experiencing high physical stress should be constructed of high nickel, corrosion resistant alloys such as INCONEL 625, (Inco Alloys International, Inc., Huntington, W. Va.), HASTELLOY C-276, (Haynes International, Inc., Kokomo, Indiana), HASTELLOY C-22 or other high nickel, corrosion resistant metal alloys known in the art. Materials and equipment experiencing low pressure static loads (such as tank linings and the like) should be constructed of corrosion resistant materials such as 2205 chrome duplex stainless steel. Materials and equipment having a high leachable nickel content, such as 304 and 316 austenitic stainless steels, should be avoided where the material or equipment will be in prolonged contact with a liquid (such as a tank lining) to avoid nickel leaching into the liquid. Alternately, where possible, composite materials, such as fiberglass-based composites, may be used.

Zinc-containing brines for use in the instant invention may be from a variety of sources. Geothermal vents are an excellent source of brines rich in zinc (Zn) and other metals. Other sources of Zn-containing brines include brines formed as a by-product of oil drilling, water outflow from copper mining operations, and Zn-containing brines mined in locales such as Illinois and Missouri in the United States. There is no preferred source of Zn-containing brine, but certain brine characteristics are preferred. A Zn-containing brine for use in the instant invention will preferably have total dissolved salts (TDS) less than 32.2% (w/w), more preferably less than 31.8% TDS. Preferred total suspended solids (TSS) are less than 20 ppm. Acidified water of lower TDS and TSS may be used to dilute the brine so that it falls within the preferred specifications. However, any water used to dilute brine must be de-aerated to an oxygen concentration of less than 300 parts per billion (ppb), preferably less than 20 to 50 ppb. Deoxygenation of water may be accomplished by any method known in the art, such as steam flushing, heating and de-aeration, and the like.

Acid, preferably hydrochloric acid (HCl), is preferably added to the brine prior to processing in accordance with the instant method to prevent iron silicate precipitation. Scaling inhibitors (compounds which prevent the precipitation of barium sulfate and calcium fluoride) are also preferably added to the brine prior to processing, as described in U.S. Pat. Nos. 5,268,108 and 5,288,411. Examples of preferred scaling inhibitors include polyacrylate dispersants and alkylaminophosphonates.

In the case where the brine is high in silica, the brine is also preferably clarified prior to use in the instant method. A preferred method of clarification involves collecting the brine in a clarification tank under a steam blanket which provides three to 12 inches of water pressure. Silica particles are added to the brine as "seed crystals." These promote the formation of silica particles (approximately 5–15$\mu$ in size), thereby reducing the quantity of silica in the brine. Silica particles are preferably removed before the brine is subjected to the methods of the invention. Silica particles may be removed by any convenient method in the art, such as filtration, centrifugation, settling/sedimentation, or a combination thereof.

A reducing agent may optionally be added to the brine. Examples of reducing agents useful in accordance with the instant invention include, but are not limited to, sodium dithionite, sodium bisulfite, sodium sulfite, sodium thiosulfate, iron metal filings, stannous chloride, aluminum metal powder, sodium formate, formaldehyde, sodium formaldehyde bisulfite, sodium formaldehyde sulfoxylate, carbon disulfide, sulfur, potassium iodide, potassium cyanide, hydroquinone, phenol, t-butanol, ethylene glycol, methanol, butyraldehyde, glyoxal and the like. The preferred reducing agent is sodium formate. Generally, reducing agents may be added at concentrations of up to about 750 ppm. If the reducing agent is sodium formate, the concentration is preferably 10 to 750 ppm, more preferably 33 to 500 ppm, and most preferably 66 to 150 ppm. Addition of a reducing agent to the brine reduces scaling in the IX resin and associated equipment due to ferric silicate deposition.

The IX system employed in a preferred embodiment of the present invention is a continuous batch operation. The brine feeds continuously through a series of three-column "trains" of IX columns. The number of trains varies depending on the design of the brine and zinc flow. The brine flow rate, zinc concentration in the brine, brine analysis and brine specific gravity are all factors considered when setting up a system. Elution of each IX column is completed on a batch basis and the frequency of elution is dependent on the brine flow and zinc grade which dictate how rapidly an IX column is loaded with zinc. During the loading stage (1A1), the brine solution is delivered to the IX systems at approximately 230° F. and is introduced to the top of the lead IX columns where the resin selectively retains the zinc.

The Zn-containing brine is passed over a strongly basic anionic ion exchange resin (IX) that binds Zn. Preferred ion exchange resins include the chloride form of quaternary amine divinylbenzene/styrene copolymer (sold by Rohm & Haas Co., Philadelphia, Pa., as AMBERLITE IRA-900 and AMBERJET 4200Cl), the chloride form of trimethylamine-functionalized chloromethylated copolymer of styrene and divinylbenzene (sold by Dow Chemical as DOWEX 21K XLT), and the chloride form of benzene, diethenyl polymer with ethenylbenzene, chloromethylated, trimethylamino-quaternized (sold by Bayer Aktiengesellschaft, Leverkusen-Bayerwek, Germany, as LEWATIT M510). IX resin may be loaded in batch or column formats, although column format is preferred. For each loading cycle, approximately 20 to 40 bed volumes of brine, preferably about 35 bed volumes, are passed over the IX resin.

It has been found that it is preferable that solutions coming into direct contact with brine during the IX process contain a reducing agent. Brine is frequently high in oxidizable metal ions, particularly ferrous ions. Addition of a reducing agent to solutions coming into contact with brine substantially reduces oxidation of ferrous and other ions, inhibiting scale formation in the IX resin and columns.

Prior to loading, the resin is preferably mixed or equilibrated with acidic (pH 2) water containing a reducing agent. Reducing agents useful in accordance with the instant invention include sodium dithionite, sodium bisulfite, sodium sulfite, sodium thiosulfate, stannous chloride, sodium formate, formaldehyde, sodium formaldehyde bisulfite, sodium formaldehyde sulfoxylate, carbon disulfide, sulfur, potassium iodide, potassium cyanide, hydroquinone, phenol, t-butanol, ethylene glycol, methanol, butyraldehyde, glyoxal and the like. Preferably, the reducing agent is sodium formate at a concentration of about 66 to 150 ppm.

IX resin elution may be a multistage process. Preferably, all IX resin elution stages are performed at an elevated temperature sufficient to reduce barium sulfate, calcium fluoride and iron silicate precipitation, preferably between about 170 to 230° F. and more preferably 190 to 210° F. Maintaining the temperature at these levels reduces the possibility of thermal shock to the resin and to reduce precipitation. Care must also be taken to avoid overheating in any IX loading, resin loading or elution stage. If the column format is used, the temperature must be controlled to avoid flashing within the column, which can introduce voids through steam generation and disrupt the performance of the resin elution process.

Control of column operating pressure is important to preserve the integrity, operating life and longevity of the IX resin. Preferably, the pressure drop across the column is less than 10 pounds per square inch (psi) during loading, washing, backwashing and eluting operations. Greater pressure drop may result in resin bead damage, leading to reduced yields and increased operating costs.

The following is a description of each stage of the preferred elution sequence.

Stage 1A1 (see FIG. 1) is a salt wash which is designed to remove residual geothermal brine from the IX column prior to elution in order to control calcium, iron and other ions entering the IX product streams. Stripping zinc during this stage is prevented by maintaining a high level of chloride in the solution. Sodium formate is added to this solution to control ferric iron precipitation. To achieve this, recycled raffinate is mixed with crystalline salt in a salt wash tank which is provided with a steam coil to keep the desired temperature of 190° F. The raffinate/salt mixture is fed to the column and its destination after exiting the column is the raffinate tank. From the raffinate tank, the solution is pumped into the brine feed at a constant rate for the remainder of the elution sequence.

Preferably the wash solution is about 0.5 to 1 bed volumes, more preferably about 0.7 bed volumes. In this context, bed volume means total bed volume which is the excluded volume plus the void volume. The IX resin is preferably washed with an aqueous acidic sodium chloride solution at 190° F. Preferably the pH of the wash solution is about 2.0 and the sodium chloride concentration is from about 1% to about 4% sodium chloride, more preferably 2.5% sodium chloride (0.3 to 1.0 M, more preferably 0.5 M). Use of the aqueous acidic sodium chloride solution in the wash stage allows for separation of zinc from other ions such as iron as the zinc chloride complex is held tightly by the resin. Other ions physically present in the brine and not strongly associated with the resin such as calcium and barium are removed through this washing step.

A reducing agent, preferably sodium formate, may be added to any of the IX column solutions. Preferably, the reducing agent is at least added to the solutions used for Stage 1A1 and in any re-equilibration steps, and is also preferably added to the solution for Stage 1A. In the case that sodium formate is added, a sodium formate concentration of about 66 to 500 ppm is preferred, more preferably about 60 to 150 ppm.

The elution flow rate through resin is between 0.25:1 and 0.5:1 bed volumes per minute (BV/m). For example, when the bed volume is 72 gallons and the elution flow rate is 0.5 BV/m, the flow rate is 36 gpm.

Figure 2:
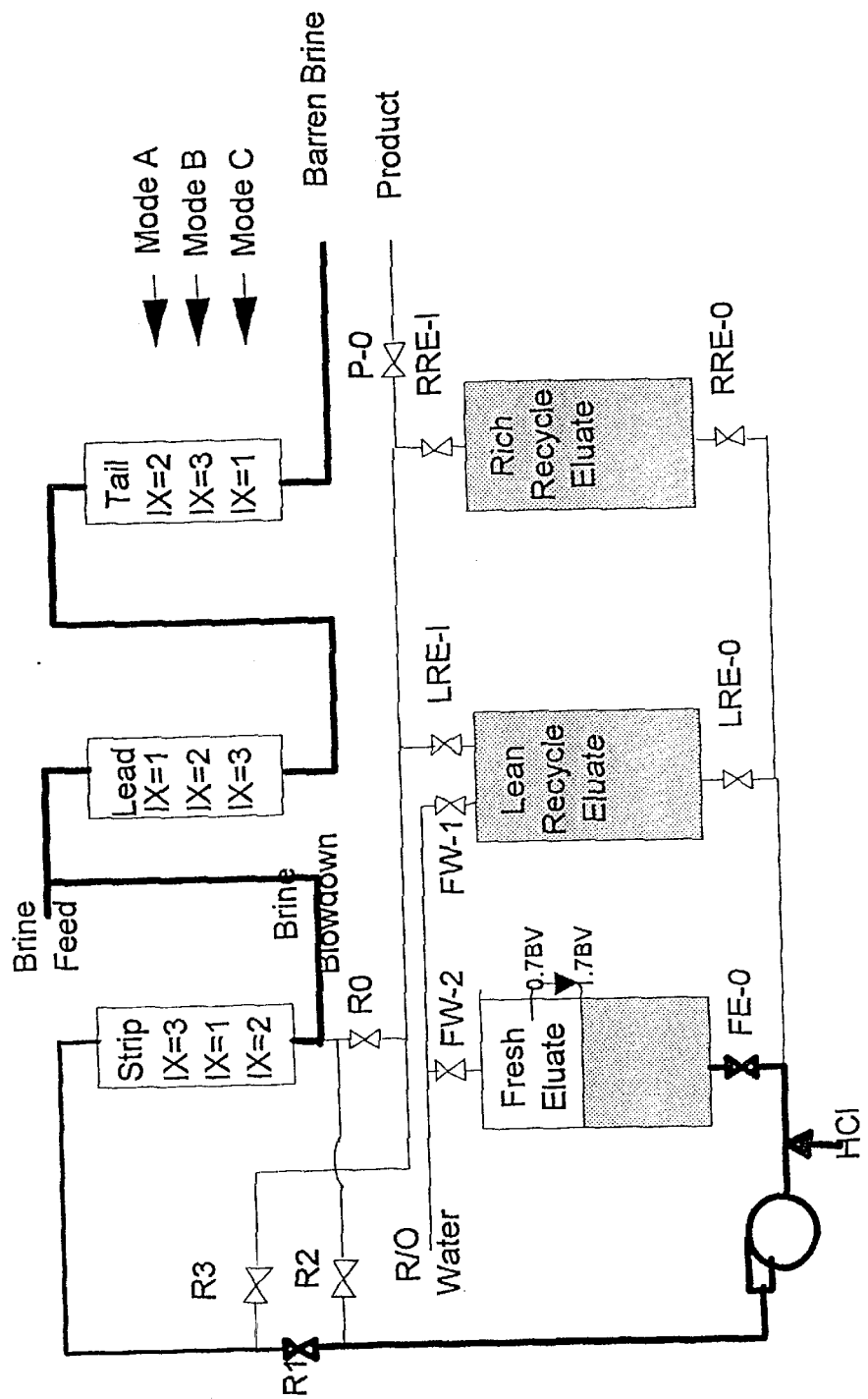
FIG. 2 illustrates Stage 1A of the inventive method.

Stage 1A (see FIG. 2), a blowdown stage, is a further wash cycle designed to remove the salt wash solution from the column as well as any remaining geothermal brine not removed during the salt wash. Fresh eluant is used which causes some zinc stripping from the resin. The eluant from this stage is preferably recycled onto the column in a later cycle. For example, the eluant from this stage can be directed to a blowdown tank, the contents of which are mixed with fresh brine prior to IX processing.

Figure 3:
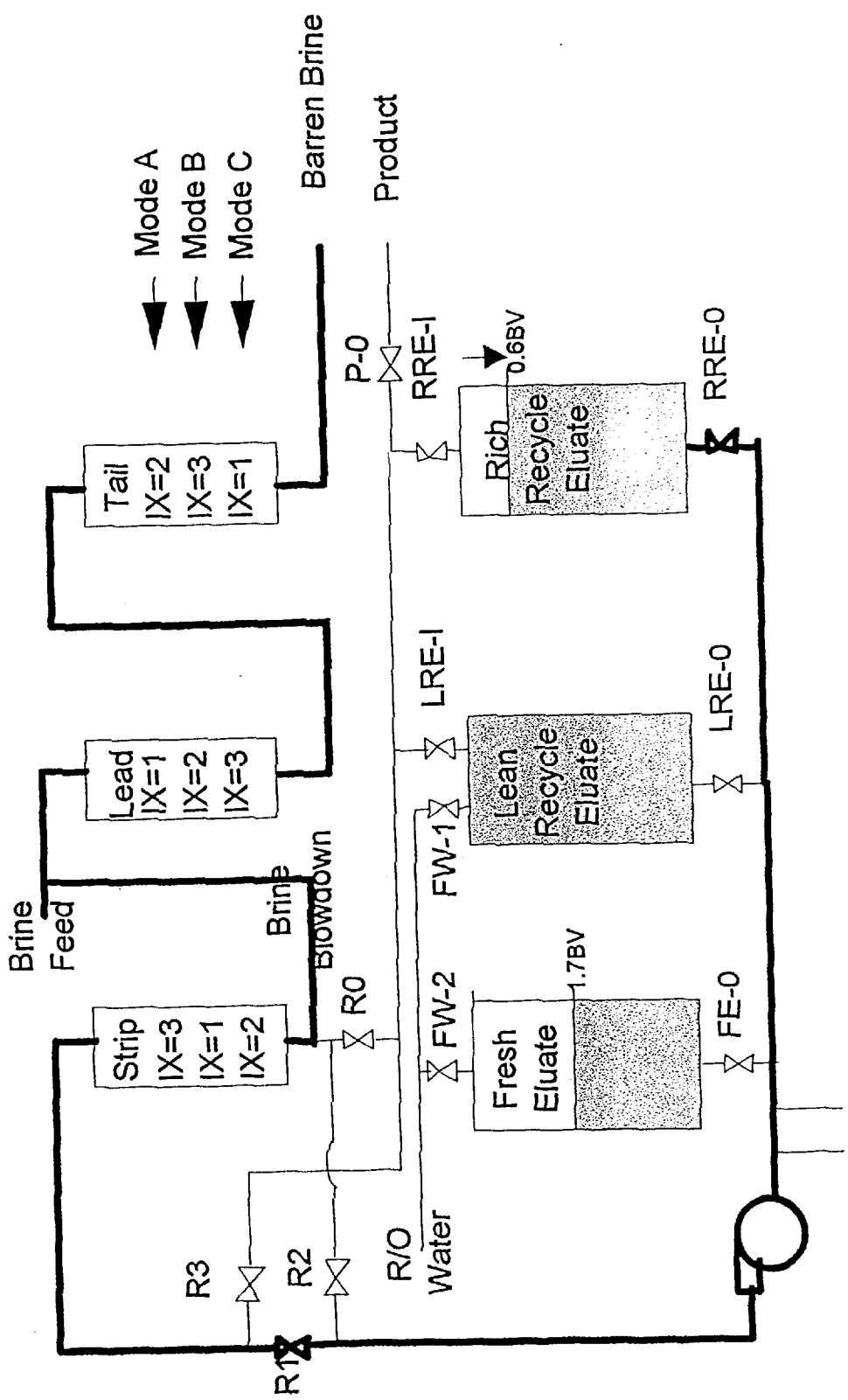
FIG. 3 illustrates Stage 1B of the inventive method.

Stage 1B (see FIG. 3) is used to prepare the column for producing product eluate. Its purpose is to wash the remaining fresh eluant from the preceding cycle from the column and replace it with rich recycle coming from a rich recycle tank. The destination of the eluant after exiting the column is also a raffinate tank. Elution is preferably performed with high quality, low (i.e., $\leqq 25$ ppm) total dissolved salts (TDS) water. In one preferred embodiment, the elution is performed using "rich recycle eluate" and "lean recycle eluate" in a controlled sequence. The eluates are recycled from a previous elution cycle. The pH of the elution water is preferably less than about pH 2. The elution water is also preferably de-aerated or de-oxygenated prior to use. De-aeration or de-oxygenation may be accomplished by any method known in the art, such as steam flashing, heating and vacuum de-aeration, and reverse osmosis, and is preferably accomplished by physical rather than chemical processes. De-aeration or de-oxygenation of the elution solution reduces scaling of the IX resin by ferric iron and ferric silicate deposition.

Figure 4:
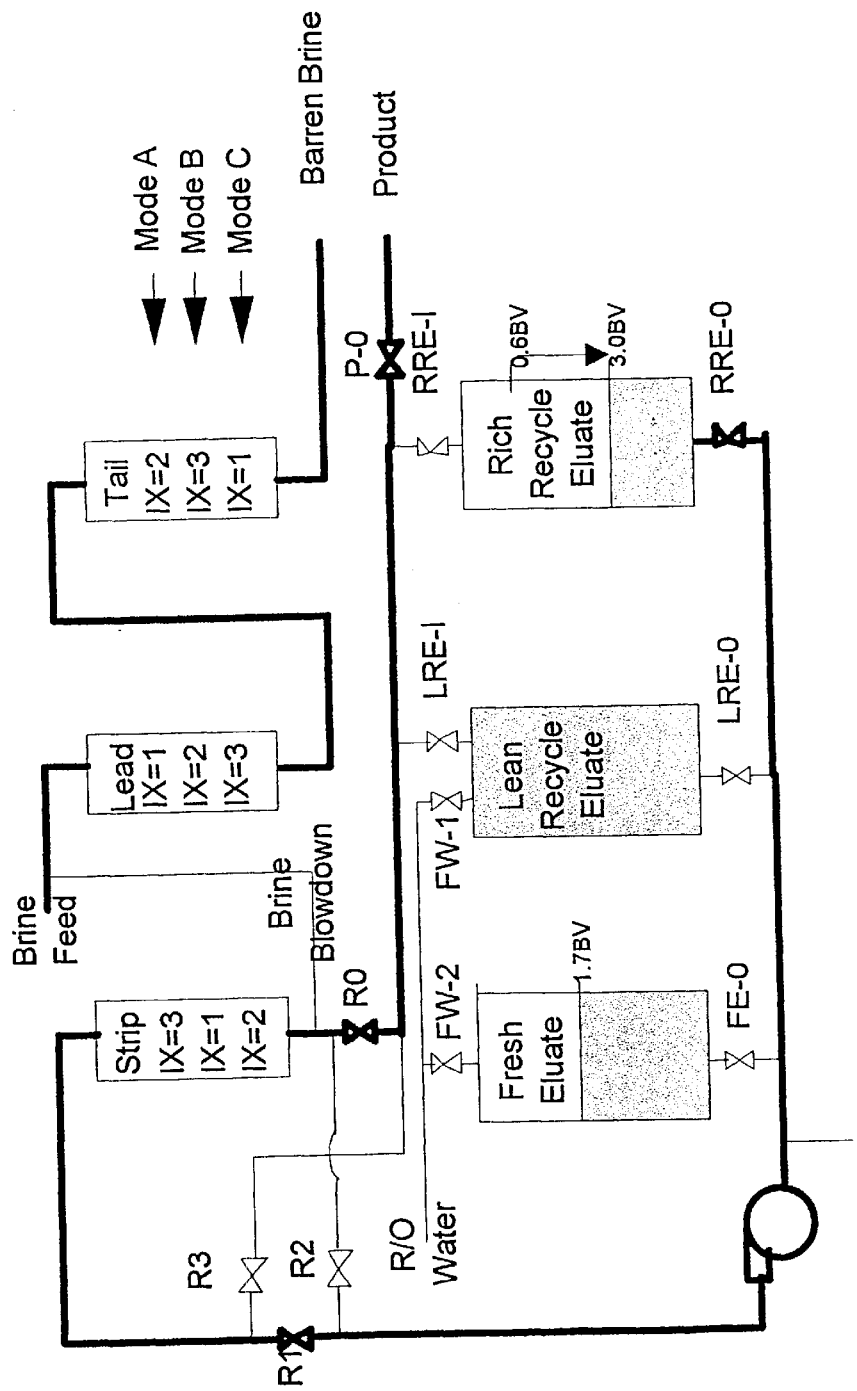
FIG. 4 illustrates Stage 1C of the inventive method.

Stage 1C (see FIG. 4) is the main product cycle for each mode. The source of eluant is a rich recycle tank and the volume varies with the amount of zinc present on the resin. The destination of the eluate is the IX product tank.

Figure 5:
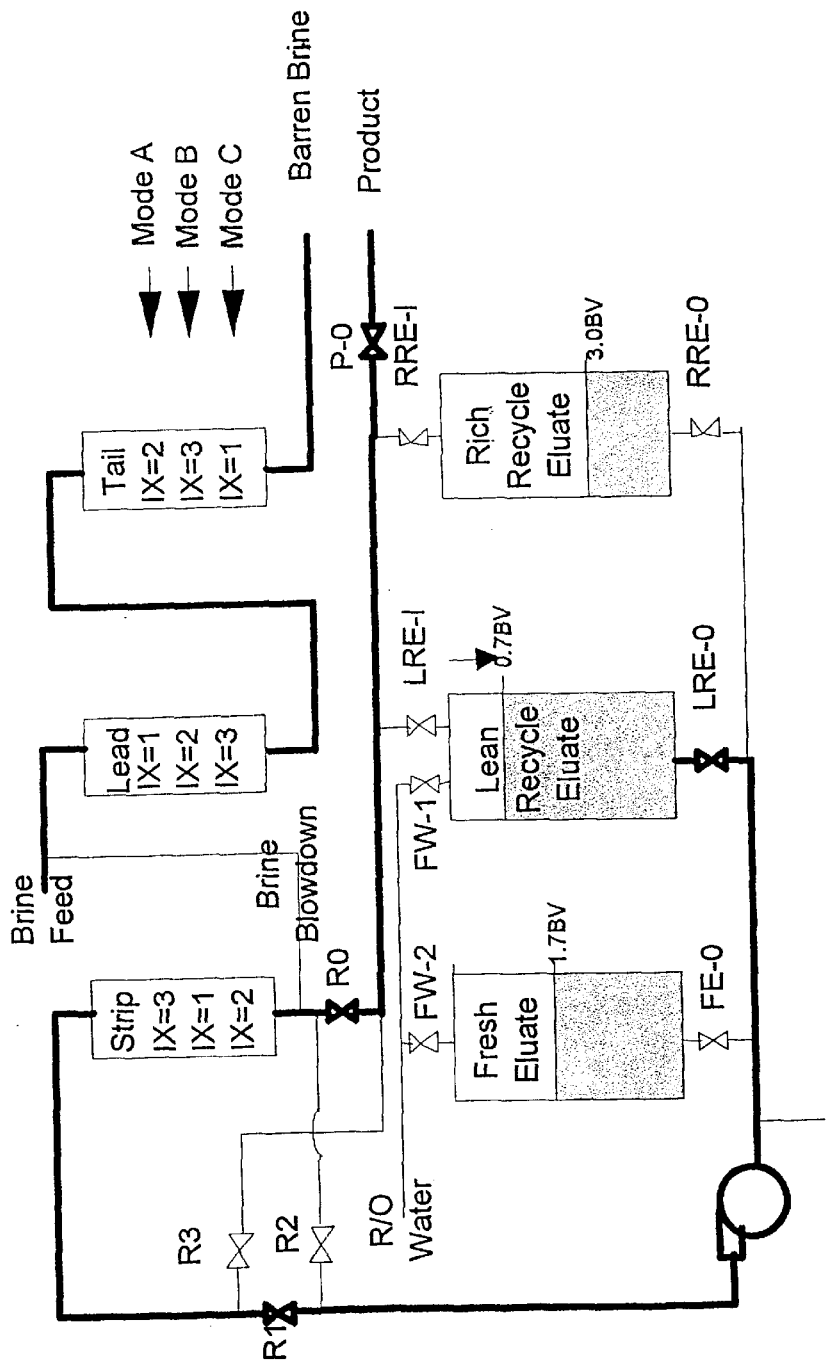
FIG. 5 illustrates Stage 2A of the inventive method.

In Stage 2A (see FIG. 5), the remaining IX product is washed into a IX product tank using lean recycle solution from an intermediate tank.

Figure 6:
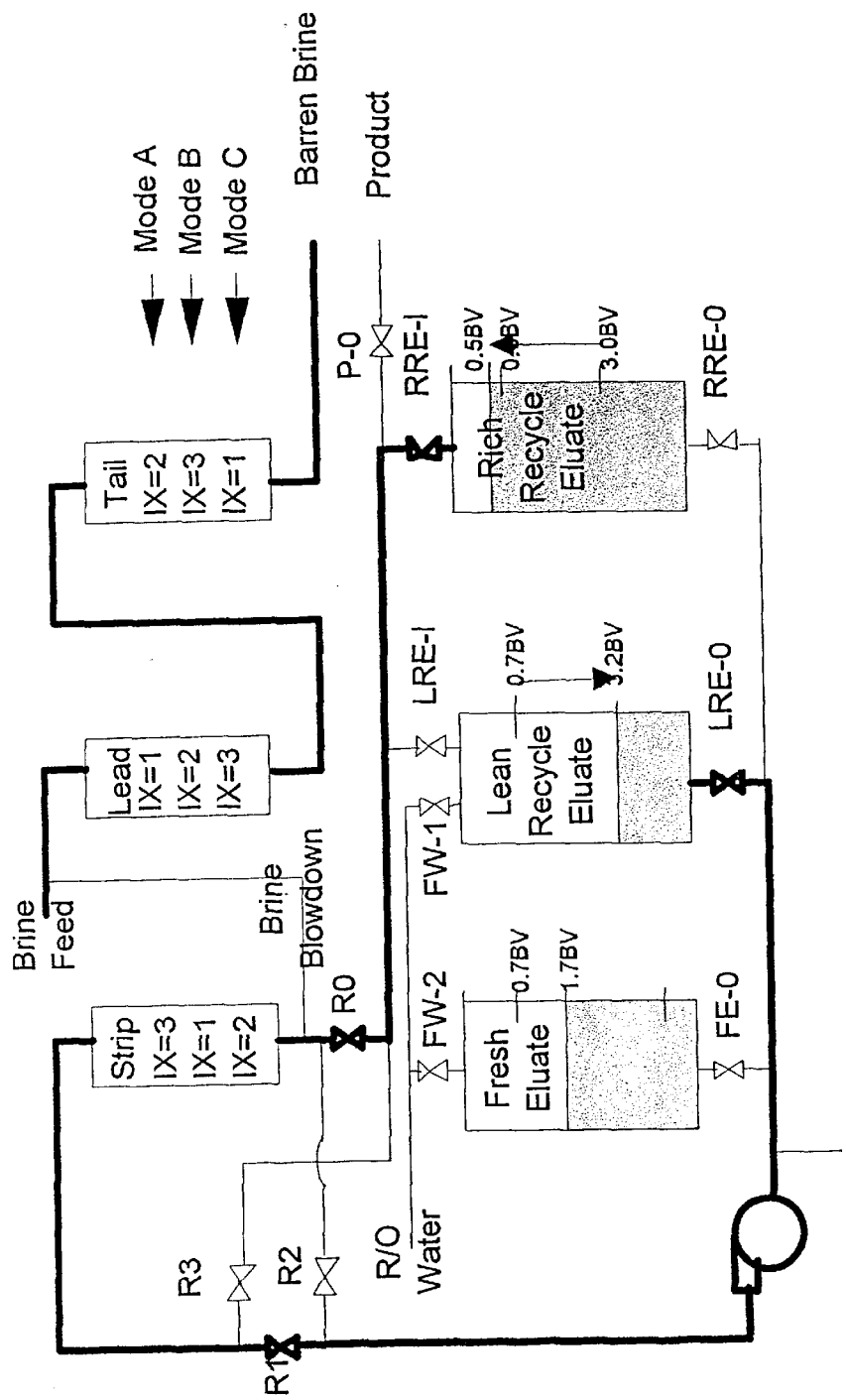
FIG. 6 illustrates Stage 2B of the inventive method.

In Stage 2B (see FIG. 6), the column is eluted with lean recycle. The rich recycle tank is replenished using this solution from the lean recycle tank. The destination of the eluate after exiting the column is the rich recycle tank.

Figure 7:
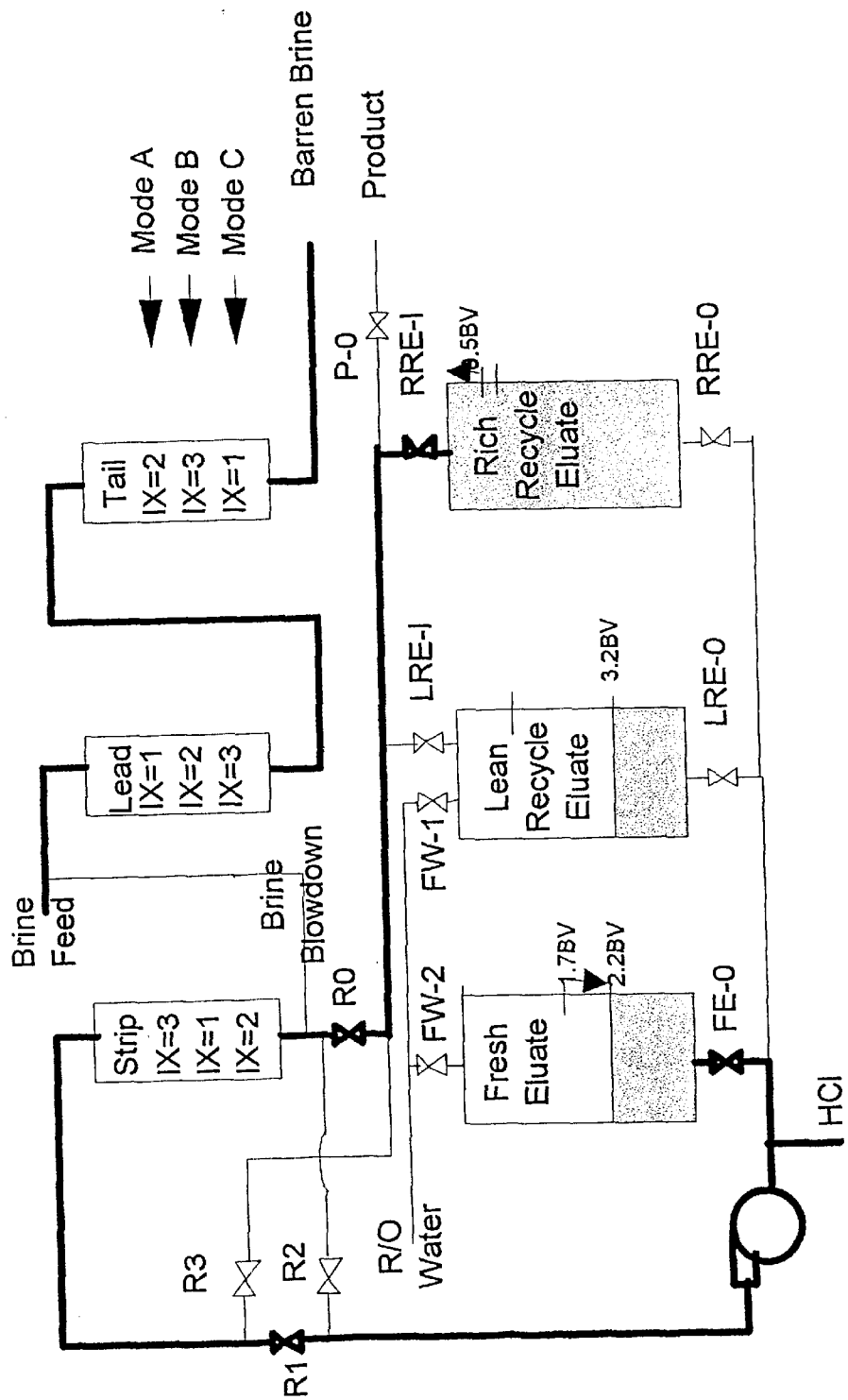
FIG. 7 illustrates Stage 3A of the inventive method.

In Stage 3A (see FIG. 7), fresh eluant with or without HCl added for pH control is used to wash the remaining solution from the preceding cycle into the rich recycle tank to complete the replenishment of the rich recycle tank.

Figure 8:
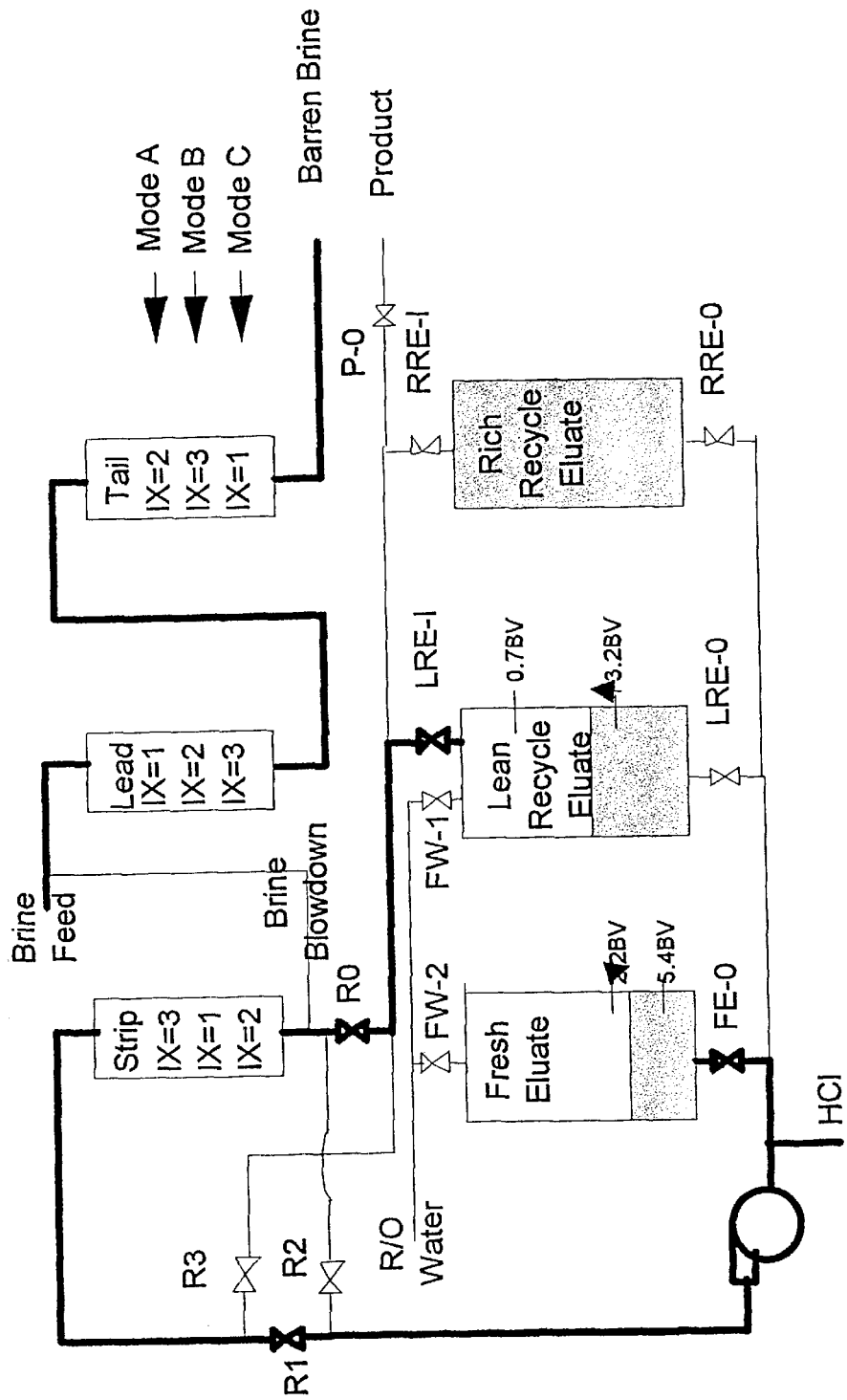
FIG. 8 illustrates Stage 3B1 of the inventive method.

In Stage 3B-1 (see FIG. 8), fresh eluate with or without HCl added for pH control is pumped through the column producing lean grade zinc solution which is used to replenish the lean recycle tank.

Figure 9:
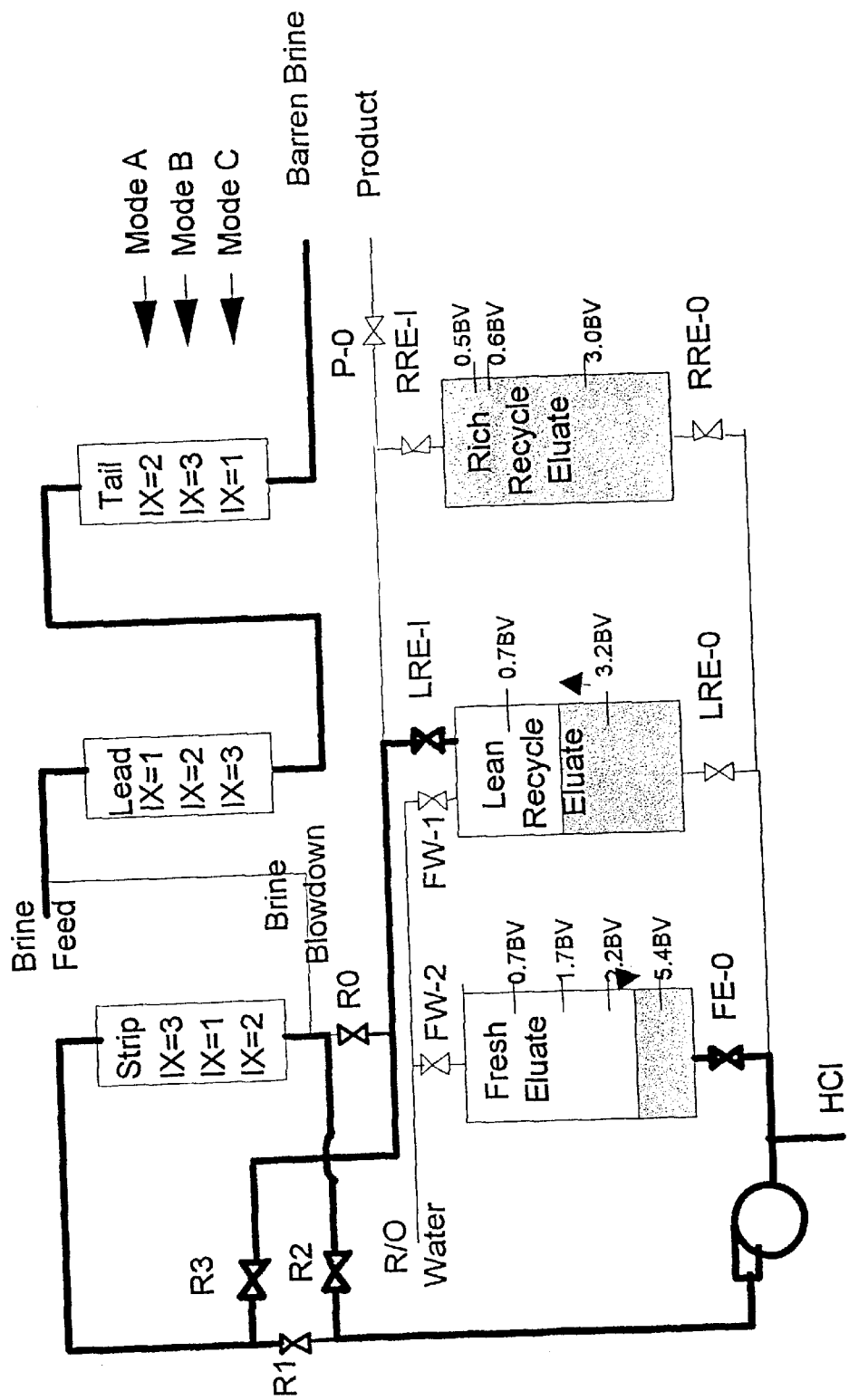
FIG. 9 illustrates Stage 3B2 of the inventive method.
Figure 10:
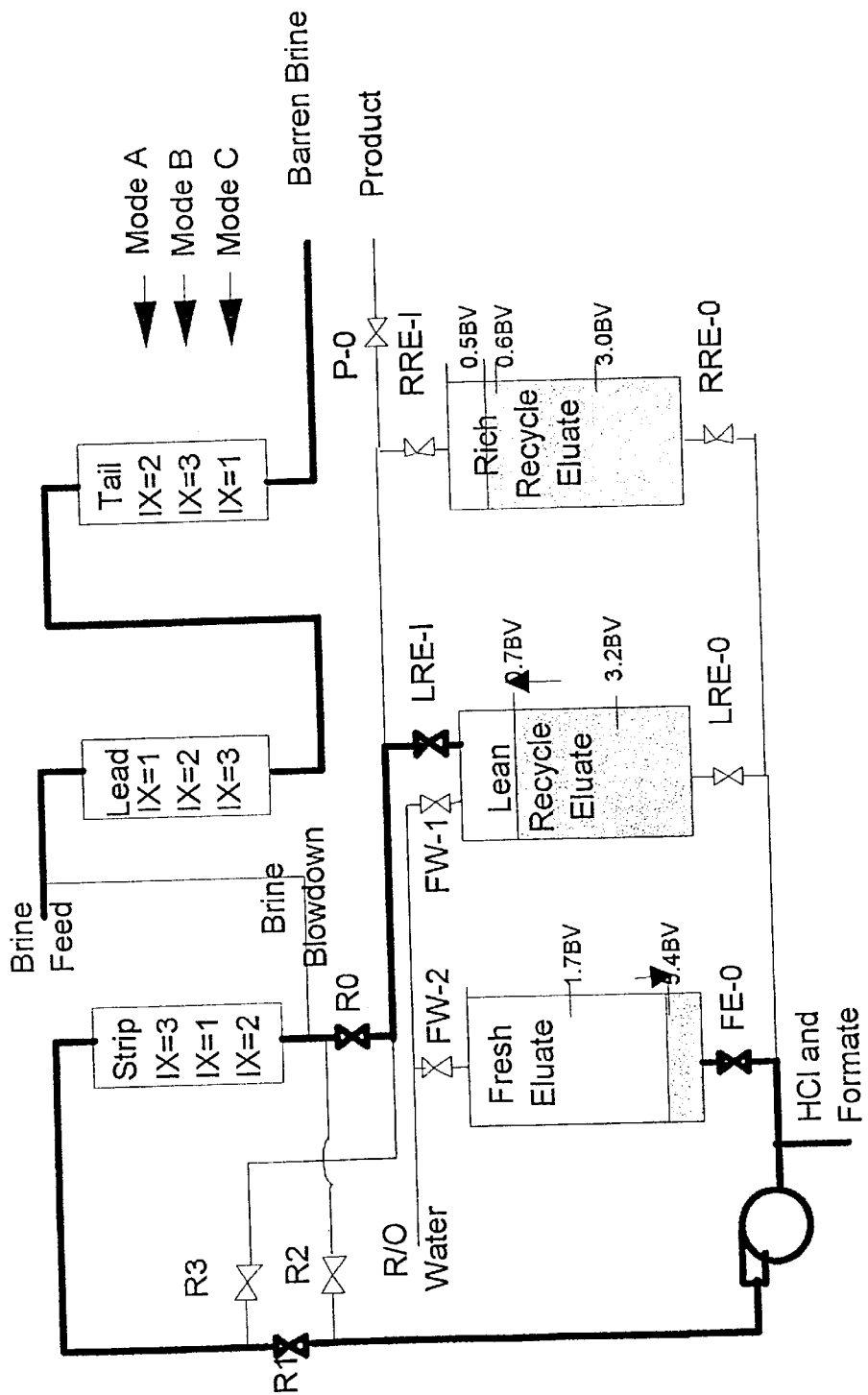
FIG. 10 illustrates Stage 3B2-1 of the inventive method.

In Stages 3B2, 3B2-1 and 3B2-2 (see FIGS. 9 and 10), fresh eluant is used continue elution of the IX resin. Stage 3B2-1 (see FIG. 10), which provides for the removal of total suspended solids (TSS) which may accumulate in the IX resin during the loading stage, is a backwash step, in which solution flow is reversed and wash solution is introduced through the normal column outlet. TSS removed from the IX resin by backflushing may be collected from the eluate by any convenient method for removal of solids from aqueous solutions, such as filtration. In 3B2-1 and 3B2-2, fresh eluant is used and the eluate is used replenish the lean recycle tank.

Figure 11:
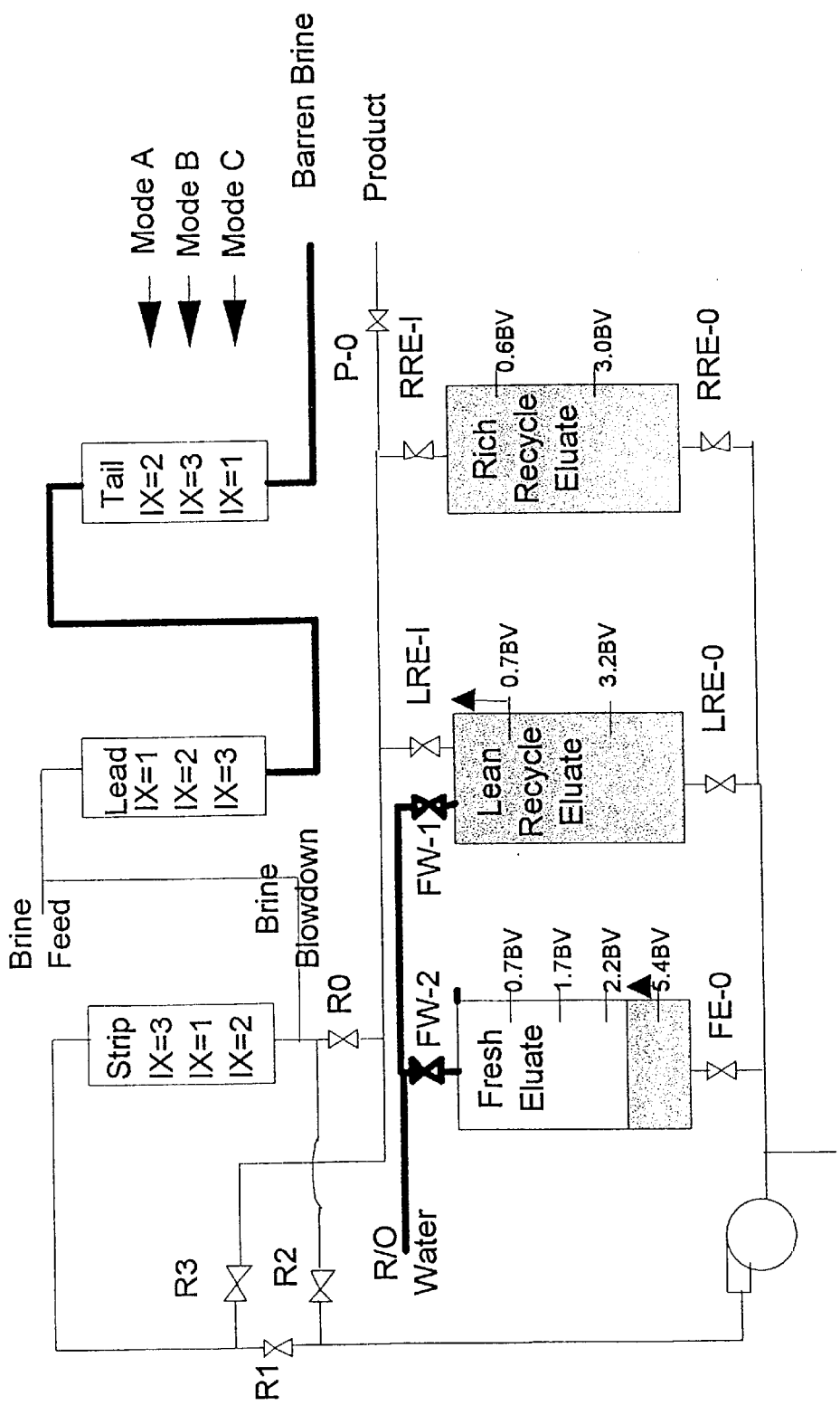
FIG. 11 illustrates Stage 4A of the inventive method.
Figure 12:
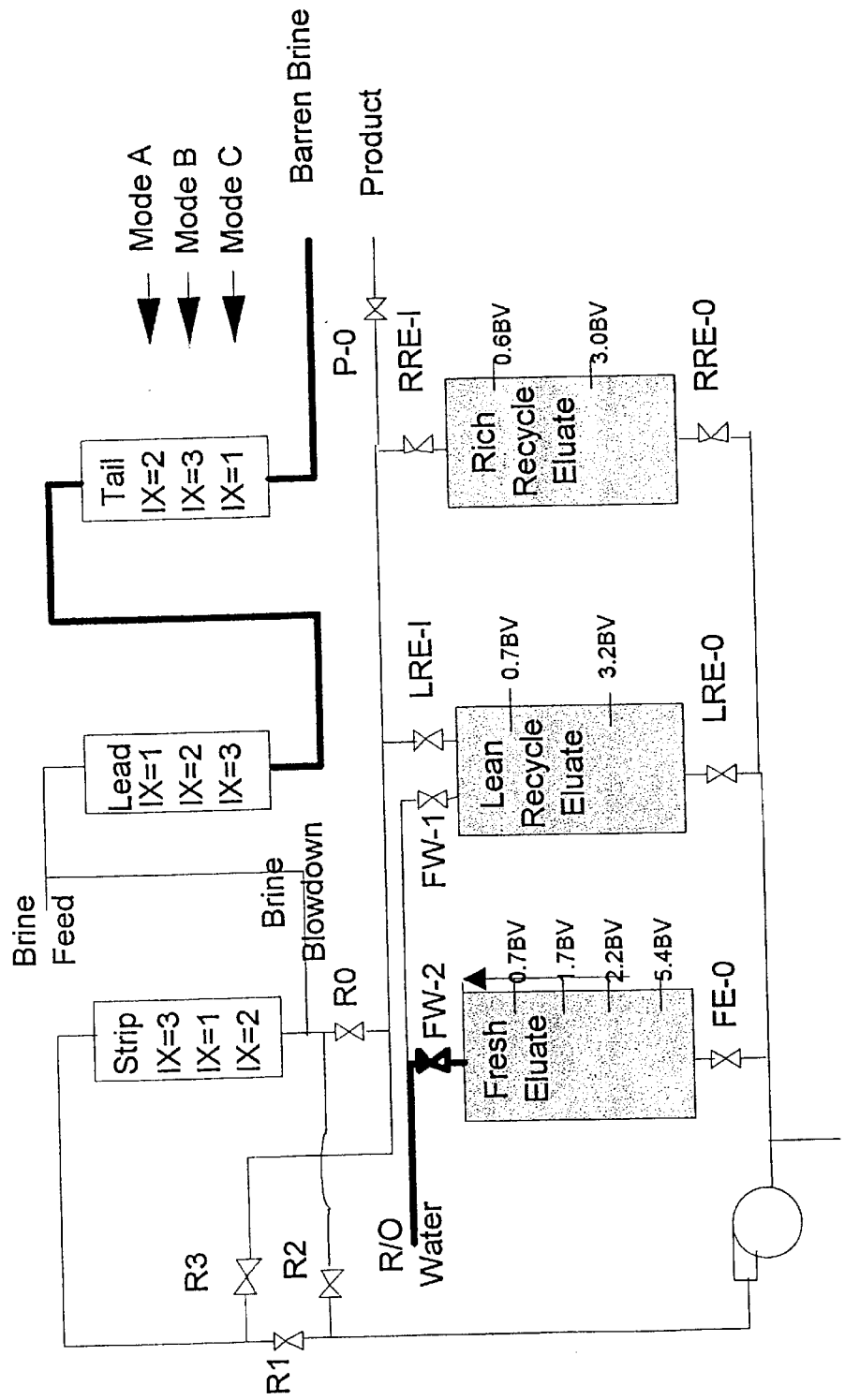
FIG. 12 illustrates Stage 4B of the inventive method.
Figure 13:
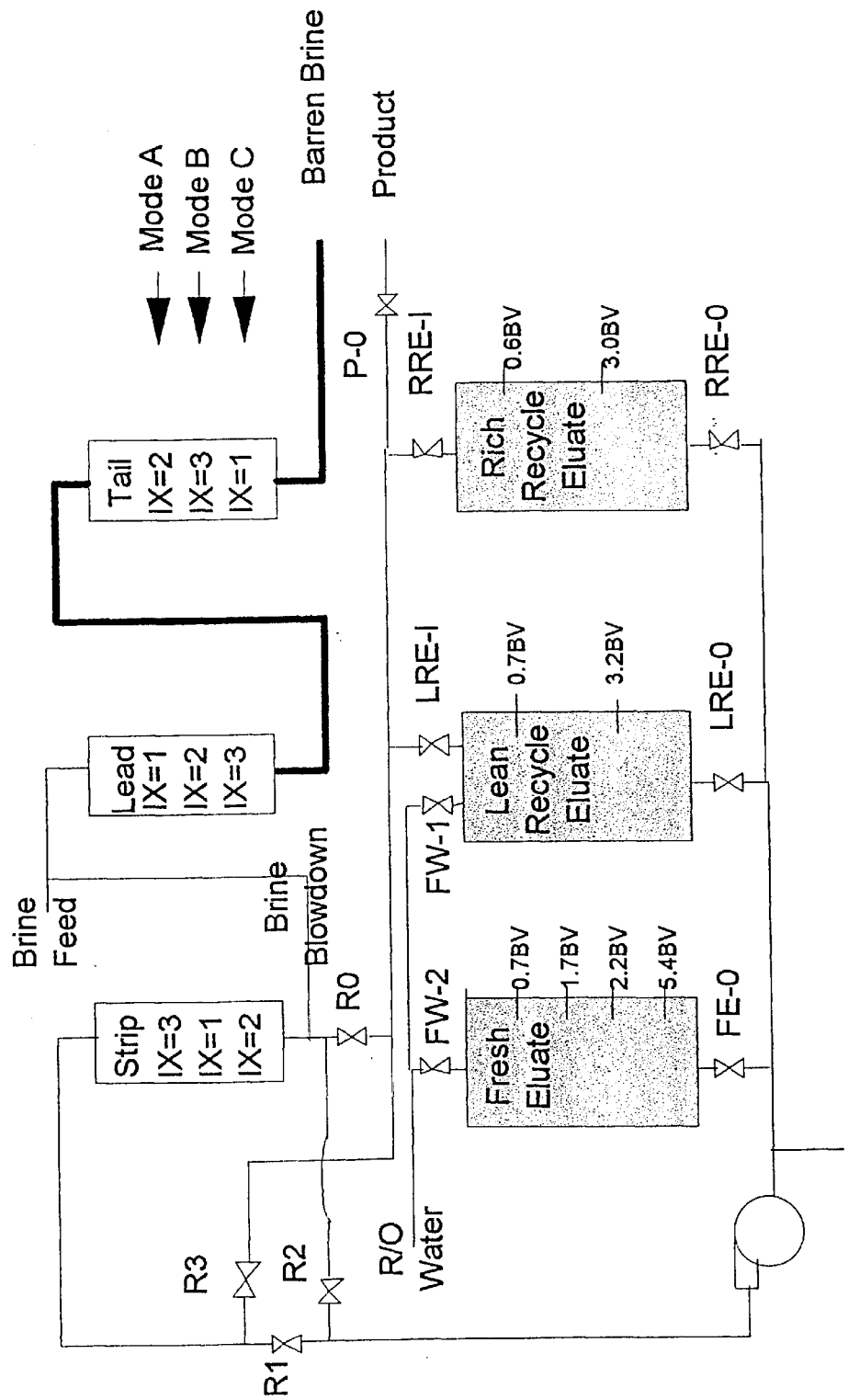
FIG. 13 illustrates Stage 4C of the inventive method.

In Stages 4A, 4B and 4C (see FIGS. 11, 12 and 13), the fresh eluant tank is replenished with water. Elution must take place at elevated temperatures to prevent thermal shock to the resin and precipitation of undesirable solids in the resin bed. Thus, the water used to fill the fresh eluant tank is heated to a temperature of 190° F. prior to elution.

After the elution cycle, the IX resin is preferably re-equilibrated in preparation for the next elution cycle. The IX resin is preferably re-equilibrated with acid water (pH about 2), optionally including a reducing agent. If a reducing agent is included in the re-equilibration solution, it is preferably at a concentration of 66–150 ppm. A preferred reducing agent is sodium formate.

The IX product collected from elution is then purified by oxidation to remove contaminating metal ions such as iron (Fe), cadmium (Cd) and lead (Pb). The purification step improves downstream efficiency. Oxidation may be accomplished by any method known in the art, such as vigorous aeration or addition of peroxide and a caustic at moderately elevated temperature. Preferably, oxidation is accomplished by addition of peroxide, preferably hydrogen peroxide ($H_2O_2$) and a caustic, preferably sodium hydroxide (NaOH) or sodium carbonate, for pH control at a moderately elevated temperature, preferably 100–170° F., more preferably at about 145° F. The oxidized contaminants may be removed using any method known in the art, such as filtration, centrifugation, settling/sedimentation, or a combination thereof.

In one preferred embodiment, oxidation is performed by the addition of hydrogen peroxide (preferably about 0.01 to 0.03 liters of 50% $H_2O_2$ per liter of brine) while the pH is controlled to about 3.7 to 4.3, preferably about pH 4.0. The oxidation/reduction potential of the oxidation reaction is preferably controlled to about 380 to 500 mV, more preferably about 400 mV. The oxidized contaminants are preferably removed by sedimentation and granular media filtration.

IX product (or purified IX product) may be used as is, or it may be concentrated by any method known in the art, such as reverse osmosis, evaporation, volatilization and the like. The eluate is preferably concentrated using reverse osmosis (RO). The eluate is preferably concentrated so as to double the concentration of zinc in the IX product. Concentration of the IX product is useful to reduce the size (volume) of subsequent steps in the recovery process, which reduces capital and operating expense. RO of the IX product yields an RO permeate (Zn-depleted) and an RO concentrate (Zn-rich). The Zn-depleted RO permeate can optionally be 'recycled' as a substitute for fresh water in IX resin elution stages.

Water-immiscible cationic organic solvent extraction (SX) is then performed on the IX product. Generally, the SX extractant and the Zn-containing aqueous (e.g., IX product or RO concentrated IX product) are mixed, preferably in a countercurrent system, then allowed to separate into discrete phases. To ensure complete extraction of Zn from the aqueous, it is preferred that SX is performed in multiple stages. Preferably, two or more extraction stages are used, with the aqueous and organic phases in a countercurrent flow arrangement. The SX extractant is scrubbed to removed deleterious metals, then stripped.

The pH of the aqueous phase should be monitored between each stage of SX, and adjusted to pH 1 to 3, more preferably about pH 2, when necessary. Generally, the pH of the aqueous phase will fall during SX stages, so addition of a caustic is sometimes required. In commercial operations, addition of caustic is preferably avoided, to reduce operational costs. Any caustic which will not interfere with the SX or EW processes is acceptable, including NaOH, a high grade lime, ammonia, sodium carbonate, and dross from Zn casting house operations (which includes ammonium chloride, zinc oxide and zinc metal).

The SX may be performed using any water-immiscible cationic organic chelating agent known in the art. Di-(2-ethylhexyl) phosphoric acid (D2EHPA) is a preferred SX extractant. The SX extractant may be diluted prior to use with any diluent known in the art to be acceptable. If the SX extractant is D2EHPA, a preferred diluent is kerosene, more preferably a low aromatic kerosene such as SX11, a hydrocarbon mixture of $C_{13}$–$C_{17}$ isoalkanes. In a countercurrent arrangement, the SX organic (SX extractant plus diluent, if used) is mixed with the Zn-containing aqueous to extract the Zn from the aqueous into the SX organic, resulting in a Zn-loaded SX organic phase and a Zn-depleted aqueous phase (SX raffinate). The overall ratio of SX organic to Zn-containing aqueous is preferably between about 1:3 and 3:1, more preferably about 1:1, and it is preferred that about a 1:1 ratio is maintained in the mixing stage. Following mixing, the two phases are separated. Preferably, the extraction process is carried out in multiple stages.

The use of mixer settler units with separate mixing and settling compartments is preferred for SX stages because it allows recycling of either of the phases from the settling cell(s) to the mixing cell(s). Such recycling reduces process volume, thereby reducing costs associated with the process. Mixer settler units may contain multiple mixing and settling compartments, to allow multiple stages of extraction, scrubbing, washing, stripping, and the like.

In a preferred embodiment, each stage of SX is carried out in a mixer settler which contains separate mixing and settling compartments, and utilizes recycling between mixing and settling compartments to maintain the organic:aqueous ratio at about 1:1. In this embodiment, extraction is preferably carried out in four stages.

The pH of the aqueous phase should be monitored between extraction stages, as the pH may drop to below 1. Preferably, the pH of the aqueous phase is maintained at about pH 2 to maximize the efficiency of the D2EHPA reagent for zinc.

The SX raffinate may optionally be concentrated, preferably by RO, to yield a Zn-depleted acid solution, which may be used in acidification of brine fed to IX, or for other uses such as acidification of brine feed for any associated facilities which utilize brine, such geothermal power production plants.

Acidified water, preferably acidified with HCl to about pH 2, is used as a scrubbing solution. Scrubbing is performed by mixing of the scrubbing solution and the Zn-loaded SX, preferably in a countercurrent flow arrangement. Scrubbing solution is used at an overall ratio of preferably 1:20 to 1:1 (scrubbing solution:Zn-loaded SX organic), more preferably about 1:20 to 1:10, more preferably about 1:15. After mixing, the two phases are separated. As with the extraction stages, scrubbing is preferably performed in more than one stage.

Preferably, a mixer settler unit is utilized for scrubbing, with recycling of the aqueous phase from the settling compartment(s) to the mixing compartment(s), such that the ratio of scrubbing solution to Zn-loaded SX organic in the mixing cell is about 1:3 to 3:1, more preferably about 1:1. In this embodiment, scrubbing is preferably accomplished in two stages.

After the first scrubbing stage, the SX organic is washed to remove residual HCl from the organic prior to the stripping stage. This wash step limits the carryover of chloride ion to the stripping stage. Washing is preferably carried out with clean water, such as RO water, at a ratio of about 1:10 to 1:20 (wash water:Zn-loaded SX organic). In one preferred embodiment, the washing is carried out in a mixer settler unit with separate mixing and settling compartments, with recycling of the wash water from the settling compartment to the mixing compartment to maintain a wash water:Zn-loaded SX organic ratio of about 1:3 to 3:1, more preferably 1:1, in the mixing cell.

The scrubbed SX organic is then stripped. Stripping is accomplished by mixing countercurrent flows of scrubbed SX organic and an acid, preferably sulfuric acid (preferably about 150 to 190 g/l sulfuric acid), yielding a stripped SX phase and a Zn-loaded electrolyte phase. Stripping is preferably performed at an overall ratio of about 1:1 to 1:15, more preferably 1:5 to 1:10 (acid:SX organic). Stripping is also preferably accomplished in more than one stage.

In a preferred embodiment, stripping is performed in a mixer settler with separate mixing and settling compartments, with recycling of the acid from the settling compartment(s) to the mixing compartment(s) to maintain a ratio of 1:1 (acid:organic) in the mixing compartment. In this embodiment, stripping is accomplished in two stages.

Stripping the SX organic with sulfuric acid may extract metal ions other than Zn, such as calcium (Ca). Calcium sulfate may be precipitated from the Zn-loaded electrolyte by lowering the temperature of the Zn-loaded electrolyte to the point that the solution become supersaturated in calcium sulfate, then adding calcium sulfate seed crystals. The precipitated calcium sulfate may be removed by filtration, centrifugation, settling/sedimentation, combinations thereof, or any other method known in the art.

Preferably, the stripped SX organic is reused for extraction of IX eluate. When stripped SX organic is reused, it is preferable to periodically regenerate the SX organic by extraction with 6 molar (M) HCl. 6 M HCl extraction is useful for removing any residual amounts of zinc in addition to iron and minor contaminant metals such as cadmium that are not extracted in the stripping process. The regeneration is preferably performed at an overall ratio of about 15:1 to 1:1 (v/v organic:aqueous), more preferably at an overall ratio of about 10:1. The necessity for regeneration of stripped SX organic will be apparent to those skilled in the art, and can be recognized by reduced organic extraction performance. Additionally, SX organic with high iron loads can appear orange in color.

Preferably, regeneration of SX organic is performed in a dual cell extraction unit, with recycling of the acid from the settling cell to the mixing cell, such that the ratio of acid to SX organic is about 1:3 to 3:1, more preferably about 1:1.

The Zn-loaded electrolyte may now be used for electrowinning of Zn metal from the solution. The electrowinning may be performed using parameters known to those of skill in the art. One preferred method of electrowinning employs a lead/silver anode and an aluminum cathode. The addition of a minimal amount of meta/para creosol may optionally be added for sulfuric acid mist (SAM) control. An effective amount of an animal glue is added for zinc plating morphology control. These organic additives when employed are added in minimal amounts to minimize their adverse effects on electrowinning current efficiency. In a preferred method for controlling SAM, polypropylene balls are used to cover the electrowinning chamber.

The zinc thus recovered is substantially pure. Substantially pure zinc is preferably at least 90%, 95%, 97%, or 99% pure, more preferably at least 99.9% pure, even more preferably at least 99.99% pure.

EXAMPLES

Example 1

The zinc extraction process was tested in a Demonstration Plant located at the site of a geothermal well facility that is used for electricity production. The demonstration plant utilizes three main processes, ion exchange (IX) chromatography, cationic solvent extraction (SX) and electrowinning. The IX process used three columns in a continuous process: one column was eluted while the other two columns were loaded (the loading columns were linked in series, so the first column in the series was the "lead" column and the second column was the "tail" column). After elution was completed, the eluted column was switched to the tail loading position, the lead loading column was eluted, and the tail loading column became the lead loading column.

Hot (220° F.) clarified, post-flash brine, pH controlled to 3.3–3.5, containing alkylaminophosphonate (added to inhibit barium sulfate and calcium fluoride scaling), with an average zinc grade of 650 mg/L was used as the zinc source. The brine was passed through a 23.875"×68" column containing DOWEX 21K XLT anion exchange resin (Dow Chemical Co.) at a flow rate of 42 gallons per minute (gpm).

The resin was loaded by passage of a total of 1431 gallons (batch volume) of flashed brine, then washed and eluted in a series of stages (solutions used for wash and elution stages were heated to 190° F. unless otherwise noted). The desired volume is determined by (i) the grade of the flashed brine, (ii) active loading of zinc on resin, and (iii) the volume of resin/column.

Stage 1A1—The column was washed with 0.7 bed volumes of wash solution of 2.5% NaCl (0.3 M) and 150 ppm sodium formate in raffinate, pH 2. Raffinate is a zinc-stripped acidic water recycled from the solvent extraction step (below). The column flow-through ("blowdown") was recycled back to the lead load column for recovery of contained zinc.

Stage 1A—The column was then washed with a further 1 bed volumes of water to remove residual salt. The blowdown was directed to the two columns in loading phase.

Stage 1B—0.6 bed volumes of "rich recycle eluate" (RRE) which is collected in a RRC tank reserved from Stage 3A, was introduced into the column to flush the void volume of the wash solution from Stage 1A out of the column. The void volume of acidic water was (void volume blowdown) was directed to the two columns in loading phase. At the end of the void volume blowdown the zinc-rich eluate was collected in a IX product tank.

Stage 1C—2.4 bed volumes of RRE was introduced into the column to further flush out the column. The eluate was directed to the IX product tank.

Stage 2A—0.7 bed volumes of "lean recycle eluate" (LRE) was used to complete stripping (elution) of zinc from the IX resin. Lean recycle eluate is reserved blowdown from Stages 3B1 and 3B2 of a previous elution cycle. The blowdown from this Stage ("IX product") was also directed to the IX product tank.

Stage 2B—2.5 bed volumes of LRE was used to rinse the IX column. The eluate was directed to the RRE tank for use in a future elution cycle.

Stage 3A—0.5 bed volumes of fresh eluate (water with added HCl to pH 2) was used to rinse the IX column. The blowdown from this Stage was directed to the rich recycle eluate tank, for use in a future elution cycle.

Stage 3B1—0.6 bed volumes of fresh eluate was used to further rinse the IX column. Blowdown from this Stage was directed to the lean recycle eluate tank.

Stage 3B2—approximately 2.1 bed volumes of fresh eluant were used to backflush the column (i.e., it was introduced through the normal outlet) to remove deposited solids. The backflushed solids were removed by filtration and the filtered backflush solution was directed to the lean recycle eluate tank.

Stage B2-1—approximately 0.5 bed volumes of fresh eluant (containing 100 ppm sodium formate, with HCl added to a pH of approximately 2) were introduced through the column inlet to precondition the column for the next loading cycle.

The IX product was then treated to remove iron. The IX product was pumped through an in-line heater at a controlled flow rate of 5 gpm, where it was heated to 170° F., then into the iron removal tanks. Hydrogen peroxide ($H_2O_2$) was added at a rate of 0.03 grams 50% hydrogen peroxide per liter of IX product processed, and sodium hydroxide (NaOH) was added to control the pH to 3.7–3.8. The solution was mechanically agitated in the tanks. Precipitated iron was removed by a plate frame filter press and the filtrate was polished by passing the filtrate through a series of polishing, cartridge filters designed to remove particles larger than 1 μm. Two filter presses were in parallel with one on standby at any time.

The IX product was cooled using a heat exchanger to less than 110° F., then concentrated approximately 2 fold by reverse osmosis (RO). Laboratory experiments demonstrated that the permeate from the RO process could be recycled for use in the IX process.

Zinc was extracted from the RO concentrate by solvent extraction (SX) using the water-immiscible cationic organic extractant di-(2-ethylhexyl) phosphoric acid (D2EHPA) dissolved in kerosene (SX11) as a diluent. Zinc was extracted from the aqueous RO concentrate with the organic phase (SX organic: 40% D2EHPA, 60% SX11) using four stage countercurrent process. With extraction stage, the zinc-poor aqueous phase and the zinc-loaded SX organic were passed into a settling cell where they separated. The extraction process involves the intimate mixing of the SX organic phase and aqueous phase in a mixer box. The mixed phase then overflows and gravitates to a settling cell. To assist with separation, the settling cell had a coalescer plate and picket fence installed. The raffinate (the last zinc-depleted aqueous phase from the last SX extraction stage) was passed through a coalescing tower, dual media filter (anthracite and granite) and an activated carbon column (the Spintek™ System, Spintek, Escondido, Calif.) to remove any trace organic solvent, forming a raffinate.

The zinc-loaded SX organic was then scrubbed at a flow rate of 0.25 gpm with water acidified with HCl (pH 1 to 2) at a ratio of 1:1, acidified RO to SX organic, in the mixing cell in a two stage countercurrent process using the same method as used for the extraction process. Scrub raffinate combines with the aqueous RO concentrate feed to the SX circuit and is fed to the first extract stage.

The scrubbed, zinc-loaded SX organic was stripped in a two stage countercurrent process using spent electrolyte, 160–170 g/L sulfuric acid at a flow rate of 0.5 gpm which is derived from the electrowinning process described below, regenerating the electrolyte. The fresh electrolyte was then treated to reduce the concentration of dissolved calcium sulfate, in order to eliminate problems from gypsum scaling in downstream operations. All of the regenerated electrolyte was diverted to the gypsum removal system, where the temperature of the fresh electrolyte was lowered to about 86° F. in a reactor and calcium sulfate seed crystals were added. The calcium sulfate reactor was followed by a clarifier. The precipitated gypsum separated with the clarifier was recycled back to the reactor as seed. The clarifier overflow, fresh electrolyte as treated by passage through a bank of screen coalescers and dual media filters (anthracite and garnet) and a bank of activated carbon columns (SPINTEK™ Systems, Huntington Beach, Calif.) to remove any residual organic as well as any gypsum precipitates.

The fresh electrolyte was then used in an electrowinning (EW) process to plate out high quality zinc metal. Electrowinning was carried out in a single cell with three aluminum cathodes and lead/silver alloy anodes spaced at about 90 mm. Acid mist suppressant polypropylene spheres covered the EW cell contents. The EW process was carried out at constant current, and the controller was set to maintain the current within ±5 amps of the target current density of 420 A/m$^2$ of plate area. The plate area was approximately 3 m$^2$/cathode. The zinc plate was harvested every 48 hours for at least 85% current efficiency or every 24 hours for at least 90% efficiency. The EW electrolyte was recirculated with cooling to maintain the temperature at 30–35° C. in the EW cell. The $\Delta$Zn maintained across the cell was 5 g/L Zn. Spent electrolyte was recycled for use in SX stripping.

The zinc-coated cathodes were removed from the EW cell, rinsed, then transferred for cathode stripping. The zinc-coated cathodes were manually stripped.

Results from approximately three month-long operating period are shown in Table 1.

TABLE 1

| Section Criteria | Operating Period | Units |
|---|---|---|
| 100 Brine Feed | | |
| TSS | 14.27 | ppm maximum |
| TDS | 31.69 | % maximum |
| IX | | |
| Brine feed grade | 655 | mg/l Zinc nominal |
| Availability | 94.4 | |
| Specific flow | 13.37 | gpm/sqft |
| Extraction | 93.3 | % Zinc contained |
| IX Product Grade | 3.958 | g/l Zinc |
| Resin loss/breakage | na | % maximum |
| Batch Volume | 1431 | gals |
| Iron Removal | | |
| IX Product Feed Grade | 23.12 | mg/l Fe |
| Temp. | 150 | F |
| Purified IX product (SX feed) | 0.29 | mg/l Fe |
| 200 SX | | |
| Availability | 97.5 | % |
| Extertainment loss (after Spintek) | na | ppm organic |
| Extraction with ~4 g/l feed | 94.1 | % |
| Extraction with ~8 g/l feed | 91.2 | % |
| Fresh Electrolyte | 93.2 | g/l Zinc |
| 300 EW | | |
| Availability | 96.4 | % |
| Current efficiency | 77.6 | % |
| Zinc Production | 205.6 | lb./day |
| Zinc Quality | 99.99 | % |
| Other | | |
| Gypsum Removal | 260 | mg/l Calcium |

The patents, patent applications, and publications cited throughout the disclosure are incorporated herein by reference in their entirety.

The present invention has been detailed both by direct description and by example. Equivalents and modifications of the present invention will be apparent to those skilled in the art, and are encompassed within the scope of the invention.

I claim:

1. A method for recovering zinc metal from metal-containing brine comprising the steps of:
    (a) reducing the pH of the brine to at least 3.5 to form a pretreated brine;
    (b) loading the pretreated brine onto a zinc-binding ion exchange chromatography resin to form a zinc-charged resin;
    (c) washing the zinc-charged resin with an acidic aqueous salt solution to remove zinc-depleted brine;
    (d) eluting the zinc from the zinc-charged resin with an aqueous solution to form a zinc-containing eluant;
    (e) extracting the zinc from the zinc-containing eluant into an organic phase by mixing the zinc-containing eluant with a sufficient quantity of cationic organic solvent; and (f) removing the zinc from the organic phase by mixing the organic phase with an aqueous acidic solution.

2. The method of claim 1, wherein the brine further contains silver, manganese, lithium and lead.

3. The method of claim 1, wherein the brine further comprises less than 32.2% (w/w) total dissolved salts.

4. The method of claim 1, wherein step (a) further comprises adding hydrochloric acid to the brine.

5. The method of claim 1, wherein step (a) further comprises adding a reducing agent to the brine.

6. The method of claim 5, wherein the reducing agent is sodium formate.

7. The method of claim 1, wherein the chromatography resin of step (b) further comprises a chloride form of a quaternary divinylbenzene/styrene copolymer.

8. The method of claim 1, wherein the chromatography resin of steps (b), (c) and (d) is maintained at a temperature of 170 to 230° F.

9. The method of claim 1, wherein the acidic aqueous salt solution of step (c) further comprises 1 to 4% sodium chloride.

10. The method of claim 1, wherein the step (d) further comprises the step of oxidizing the zinc-containing element to form oxidized contaminating metal ions and thereafter removing the oxidized contaminating metal ions prior to step (e).

11. The method of claim 1, wherein the organic solvent of step (e) further comprises di-(2-ethylhexyl)phosphoric acid.

12. The method of claim 1, wherein the aqueous acidic solution of step (f) is water acidified with hydrochloric acid.

13. A method for recovering zinc metal from metal-containing brine comprising the steps of:

(a) reducing the pH of the brine to at least 3.5 to form a pretreated brine;

(b) surrounding a zinc-binding ion exchange chromatography resin with a reducing agent;

(c) loading the pretreated brine onto the zinc-binding ion exchange chromatography resin to form a zinc-charged resin;

(d) washing the zinc-charged resin with an acidic aqueous salt solution to remove zinc-depleted brine;

(e) eluting the zinc from the zinc-charged resin with an aqueous solution to form a zinc-containing eluant;

(f) extracting the zinc from the zinc-containing eluant into an organic phase by mixing the zinc-containing eluant with a sufficient quantity of cationic organic solvent; and (g) removing the zinc from the organic phase by mixing the organic phase with an aqueous acidic solution.

14. The method of claim 13, wherein the reducing agent of step (b) comprises sodium formate.

15. The method of claim 13, wherein the acidic aqueous salt solution of step (d) further comprises a reducing agent.

16. The method of claim 15, wherein the reducing agent of step (d) comprises sodium formate.

* * * * *